Dec. 18, 1956  A. J. KOSCH  2,774,185
MAGNETIC TOP DEVICE
Filed March 22, 1955  2 Sheets-Sheet 1

INVENTOR.
ALOIS J. KOSCH,
BY: *Harold B. Hood.*
ATTORNEY.

Dec. 18, 1956     A. J. KOSCH     2,774,185
MAGNETIC TOP DEVICE

Filed March 22, 1955     2 Sheets-Sheet 2

INVENTOR.
ALOIS J. KOSCH,
BY: Harold B. Hood.
ATTORNEY.

United States Patent Office 2,774,185
Patented Dec. 18, 1956

2,774,185

MAGNETIC TOP DEVICE

Alois J. Kosch, Columbus, Nebr.

Application March 22, 1955, Serial No. 495,897

9 Claims. (Cl. 46—235)

This invention relates to a magnetic top device for display purposes or for use as a toy.

An object of the invention is to provide an eye-catching display device or toy which includes a rotating and revolving member having no apparent driving means.

A further object of this invention is to provide a highly attractive toy or display device which is simple in construction, dependable and safe in operation and economical to manufacture.

Further objects of the invention will become apparent as the description proceeds.

To the accomplishment of the above and related objects, my invention may be embodied in the forms illustrated in the accompanying drawings, attention being called to that fact, however, that the drawings are illustrative only, and that change may be made in the specific constructions illustrated and described, so long as the scope of the appended claims is not violated.

Figure 1:
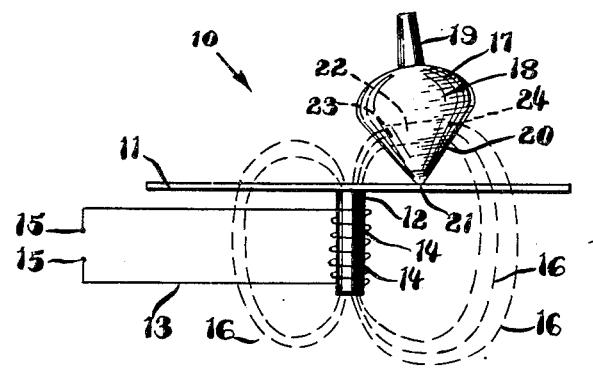
Fig. 1 is an elevational view of one form of my invention.
Figure 2:
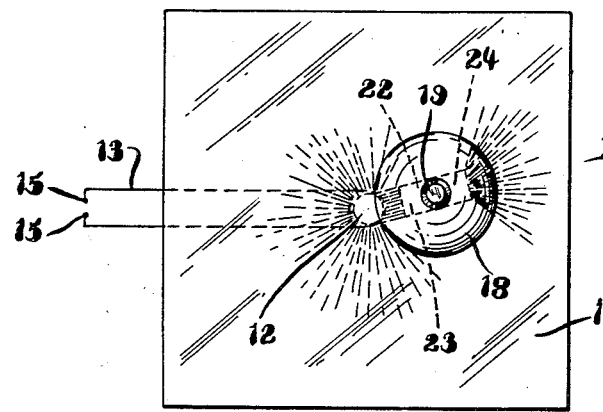
Fig. 2 is a top view thereof.

Referring to the embodiment shown in Figs. 1 and 2 of the drawings, it will be seen that I have provided a platform 11 in the form of a substantially flat member, the upper surface of which is smooth. At least the upper surface of, and preferably, the entire platform 11 is constructed of a non-magnetizable and electrically non-conductive material. For example, this material could be a suitable plastic such as Bakelite. Electromagnet means is provided, preferably formed, in part, by bar or core 12, the upper end of which abuts the lower surface of platform 11. A wire 13 of electrically conductive material has a plurality of turns 14 wrapped about the bar to form a coil; the core 12 and the coil having a common longitudinal axis. The wire 13 is shown as having a pair of terminals 15, 15 which are to be connected to an alternating current power source, preferably of the ordinary 60 cycle per second, 110–115 volt, household type to energize the device. The electromagnet formed by bar 12 and the coil, produces a stationary, alternating, torodial-shaped, magnetic field when energized. The magnetic axis of the electromagnet coincides with the longitudinal axis of bar 12. The lines of force of the magnetic field are of the general form indicated by broken lines 16, 16 in Fig. 1.

A rotatable member is provided as a part of the device, and in the embodiment illustrated in Figs. 1 and 2, takes the form of a toy top. The particular shape of the rotatable member with the exception of its base, may take any desired form provided the weight of the top is substantially uniformly balanced about the longitudinal axis thereof. Top 18 in Figs. 1 and 2 is shown as having a stem 19, a curved upper portion 17, and a tapered lower portion 20. Lower portion 20 tapers to a rounded nose 21. Embedded within top 18 is a permanent magnet means, which in this embodiment is a straight two-pole permanent magnet 22 having a north-seeking pole at end 23 and a south-seeking pole at opposite ends 24. The top 18, with the exception of its permanent magnet means, is formed of a non-magnetizable material.

To operate the device, terminals 15, 15 are connected to an ordinary 60-cycle per second household current source and the top 18 is placed in juxtaposition with respect to platform 11. Tht top 18 may be spun by snapping the thumb and forefinger while stem 19 is held therebetween, and is thereby given an initial rotational impetus sufficient to bring it to a speed of 3600 R. P. M. The top then acts as a synchronous motor and rotates with nose 21 in engagement with the upper surface of platform 11 so long as terminals 15, 15 remain connected to the power source. The top 18 is ordinarily given its initial rotational impetus with nose 21 spaced horizontally from the magnetic axis of bar 12. In this event, the upper portion of the top will lean toward the magnetic axis since the magnetic field of bar 12 is most highly concentrated there. Because nose 21 is not sharp, but is rounded, as shown in the drawing, the top tends to travel in a direction at substantially right angles to the vertical plane in which the longitudinal axis of the top is disposed. As the top travels, the upper portion thereof continues to lean toward the center and therefore, the nose continually changes its direction of travel. The result is that the nose travels around the magnetic axis of bar 12 as the top rotates.

The speed at which the top rotates is determined by the following equation:

$$S = \frac{2F}{N}$$

where:

$S$ = speed in revolutions per second,
$F$ = frequency of supply current in cycles per second, and
$N$ = number of effective poles provided in the permanent magnet means in or on the top.

Using ordinary 60 cycle per second household current and a two-pole permanent magnet as shown in Figs. 1 and 2, the top 18 will rotate at a speed of 60 revolutions per second or 3600 R. P. M. This speed is practical for a small top but when a larger rotatable member or one with a less suitable shape is used, this speed would be impractical.

Figure 3:
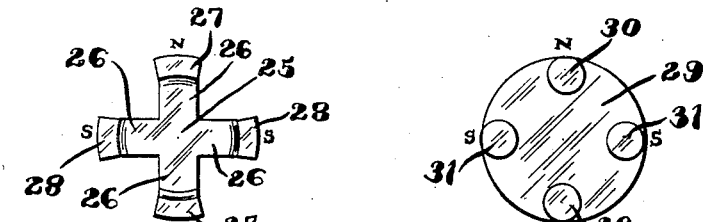
Fig. 3 is a bottom view of one form of the permanent magnetic means of my invention.
Figure 4:
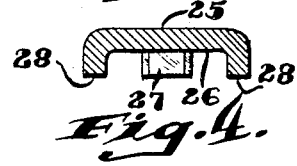
Fig. 4 is a transverse, sectional view thereof.

To permit the speed of the rotating member to be reduced, different forms of permanent magnet means for use in or on the rotatable member may be provided. In Figs. 3 and 4, I have shown one such form. In this embodiment, a permanent magnet in the form of a spider 25 is provided having radial arms 26 with north-seeking poles at the radially outer ends 27, 27 of two oppositely extending arms and south-seeking poles at the radially outer ends 28, 28 of the other two oppositely extending arms. With permanent magnet 25 mounted in or on the rotatable member, it will rotate at a speed of 30 revolutions per second or 1800 R. P. M., provided, of course, that terminals 15, 15 are connected to a 60 cycle per second, alternating current source.

Figure 5:
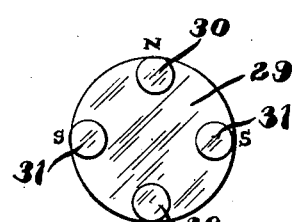
Fig. 5 is a bottom view of another form which the permanent magnetic means of my invention might assume.
Figure 6:
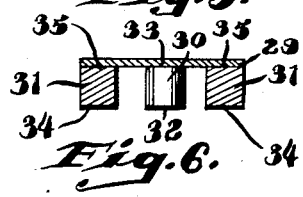
Fig. 6 is a transverse, sectional view thereof.

Another form of permanent magnet means for use in or on the rotatable member is illustrated in Figs. 5 and 6 wherein a circular support 29 of magnetizable material such as soft iron has secured thereto, as by welding, two diametrically opposed, two-pole, permanent magnets 30, 30 and two diametrically opposed, two-pole permanent magnets 31, 31. The north-seeking poles of magnets 30, 30 are located at the lowermost, free ends 32, 32, and south-seeking poles are situated at the uppermost ends 33, 33 which are secured to support 29. The south-seeking poles of magnets 31, 31 are situated at the lowermost, outboard ends 34, 34, and north-seeking poles are located at the uppermost ends 35, 35 which are secured to support 29. With the permanent magnet means shown in Figs. 5 and 6 mounted on or in the rotatable member, it will likewise rotate at a speed of 30 revolutions per second or 1800 R. P. M. when bar 12 is alternately magnetized at a rate of 60 cycles per second.

Figure 7:
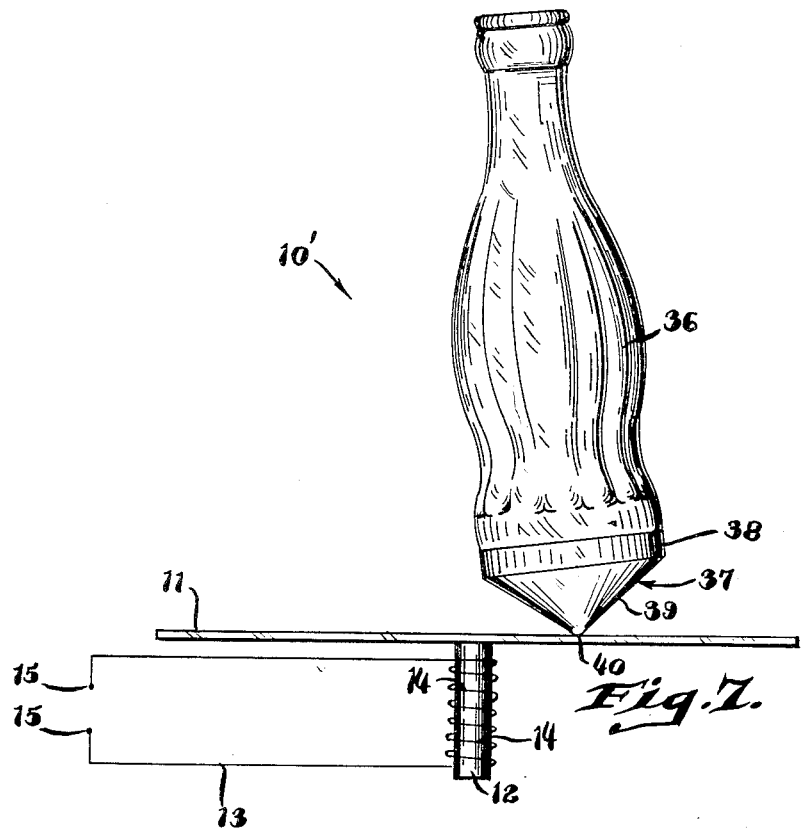
Fig. 7 is an elevational view of another embodiment of my invention, showing a rotating and revolving member of different construction than that shown in Fig. 1.
Figure 8:
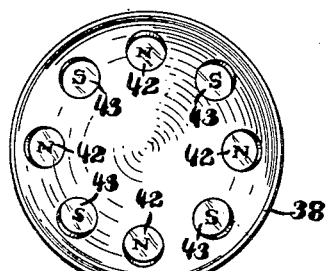
Fig. 8 is a top view of a supporting member with a plurality of permanent magnets therein, said supporting member and plurality of magnets thereon comprising a different form of permanent magnetic means than that shown in Figs. 3 and 5, respectively.
Figure 9:
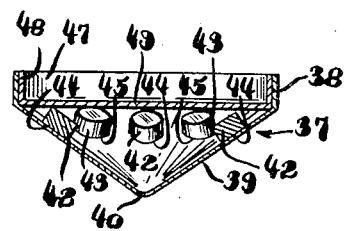
Fig. 9 is a transverse sectional view of the permanent magnet means shown in Fig. 8.

In Figs. 7, 8 and 9, another embodiment of my invention is illustrated wherein the rotatable member takes an appropriate form for display purposes; here shown as a simulated soda-pop bottle 36. The outer surface of the base of the rotatable member is formed by supporting member 37 which has a cylindrical section 38, a tapered section 39 and a rounded or spherically-tipped nose 40. Support member 37 is formed of a suitable non-magnetic material such as aluminum or plastic, and has secured thereto, as by welding, a plurality of magnets 42 and 43. The north-seeking poles of magnets 42, 42, 42, 42 are located at the lowermost ends 44, 44, 44, 44, respectively, which are secured to support member 37. The south-seeking poles of magnets 43, 43, 43, 43 are located at the lowermost free ends 45, 45, 45, 45, respectively. An iron cup-shaped member 47 having a cylindrical wall 48 and bottom 49, is fixedly secured within the internal confines of cylindrical section 38 of supporting member 37. The lowermost portion of simulated soda-pop bottle 36 is frictionally or otherwise secured within cup-shaped member 47. With the permanent magnet means shown in Figs. 8 and 9 mounted on or in the rotatable member, it will rotate at a speed of 15 revolutions per second or 900 R. P. M. when bar 12 is alternately magnetized at the rate of 60 cycles per second.

As previously noted, each of the permanent magnets shown in the embodiments of Figs. 6 and 9, respectively, has a lowermost pole and an uppermost pole. Since the magnetic force of the alternating magnetic field above bar 12 is inversely proportioned to the square of the distance of a given point from the upper end of bar 12, its effect on the lowermost poles of each of these magnets is significantly greater than its effect on each of the uppermost poles. Consequently, the lesser effect on the uppermost poles is counteracted by the greater effect on the respective lowermost poles, and the resultant total effect is to rotate the rotatable member at the speed determined by the number of lowermost poles. Accordingly, when substituting in the aforementioned equation, only the number of effective (namely: lowermost) poles is considered. Of course, each of the poles of the embodiments in Figs. 1 and 4, respectively, is on a common level, and therefore each of these poles is considered in applying the formula.

It is preferable in each permanent magnet means embodiment, that the poles be arcuately spaced apart a uniform distance. Also, each pole of each of the permanent magnet means embodiments is preferably of opposite polarity with respect to each pole arcuately adjacent thereto as shown in the drawing.

Although the upper end of bar 12 is shown in Figs. 1 and 7 as being in engagement with the lower surface of platform 11, it is apparent that it could be spaced below, in the plane of, or above platform 11, so long as the poles of the permanent magnet means revolve in the alternating magnetic field produced by the bar 12. With the upper end of bar 12 located as shown in Figs. 1 and 7, or spaced below platform 12, no apparent driving means for the rotatable member is apparent to a person viewing the device from above.

The rotatable member may assume any desired practical shape so long as the weight thereof is uniformly distributed about the longitudinal axis thereof. Of course, the rotatable member should have sufficient mass that a substantially stable, gyroscopic effect results as it rotates.

It is apparent that the alternating magnetic field produced by the electromagnet means of my invention is stationary with respect to the electromagnet means.

I claim as my invention:

1. A magnetic top device comprising a member having an upper, non-magnetic surface, means for producing about said surface a stationary, alternating, toroidal-shaped, magnetic field, the magnetic axis of which is perpendicular to said surface, a rotatable member having a base which terminates in a nose through which the longitudinal axis of said rotatable member passes, said rotatable member being provided with permanent magnet means having its poles arcuately spaced about said longitudinal axis such that when the rotatable member is given a rotatable impetus, with the nose of said rotatable member in engagement with said surface, the rotatable member will continue to rotate so long as said means continues to produce said alternating magnetic field.

2. The device of claim 1 wherein said nose is of rounded form such that when it is in engagement with said surface and spaced from said magnetic axis, the nose will travel on said surface about the magnetic axis.

3. The device of claim 1 wherein each pole of said permanent magnet means is of opposite polarity with respect to each pole arcuately adjacent thereto.

4. The device of claim 1 wherein said permanent magnet means comprises a permanent magnet with a plurality of radially extending arms, each arm having a magnetic pole thereon of opposite polarity with respect to each pole arcuately adjacent thereto.

5. The device of claim 1 wherein said permanent magnet means comprises a plurality of permanent magnets arcuately spaced about said longitudinal axis, the poles of each permanent magnet being of opposite polarity with respect to each pole arcuately adjacent thereto.

6. The device of claim 5 wherein said permanent magnets are mounted on a magnetic support.

7. The device of claim 5 wherein said permanent magnets are mounted on a non-magnetic support.

8. A magnetic top device comprising a member having an upper, non-magnetic surface, a magnetizable core mounted with its axis substantially perpendicular to said surface, an electrically conductive coil wrapped about said core and coaxial therewith, said electrically conductive coil being adapted to be connected to an alternating current power source, a rotatable member having a base which terminates in a nose through which the longitudinal axis of said rotatable member passes, said rotatable member being provided with permanent magnet means having its poles arcuately spaced about said longitudinal axis such that when the nose of said rotatable member is placed in engagement with said surface, and the rotatable member is given a rotational impetus, the rotatable member will continue to rotate so long as said coil continues to be energized by said alternating current supply source.

9. The devcie of claim 8 wherein said nose is of rounded form such that when it is in engagement with said surface and spaced from said magnetic axis, the nose will travel on said surface about the magnetic axis.

References Cited in the file of this patent

UNITED STATES PATENTS 1,731,057     Overholt  ---------------- Oct. 8, 1929